Dec. 7, 1937.  C. A. MICHEL ET AL  2,101,748
LUGGAGE COMPARTMENT LAMP
Filed May 27, 1935  2 Sheets-Sheet 1
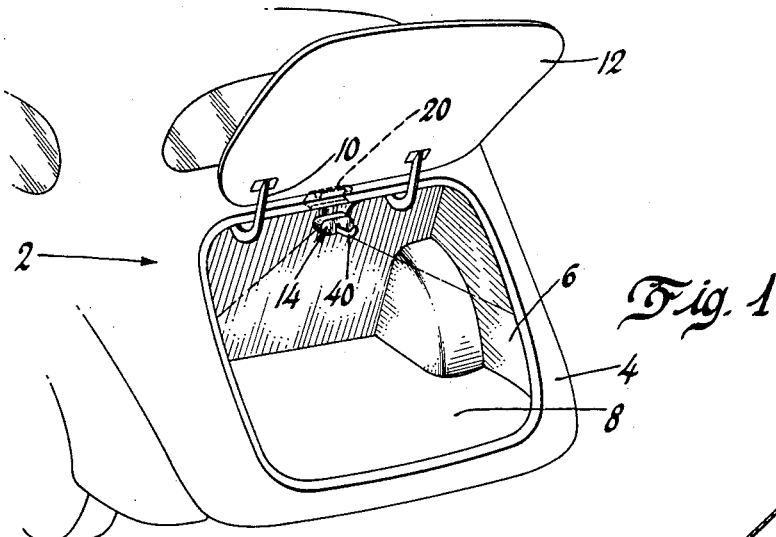
Fig. 1
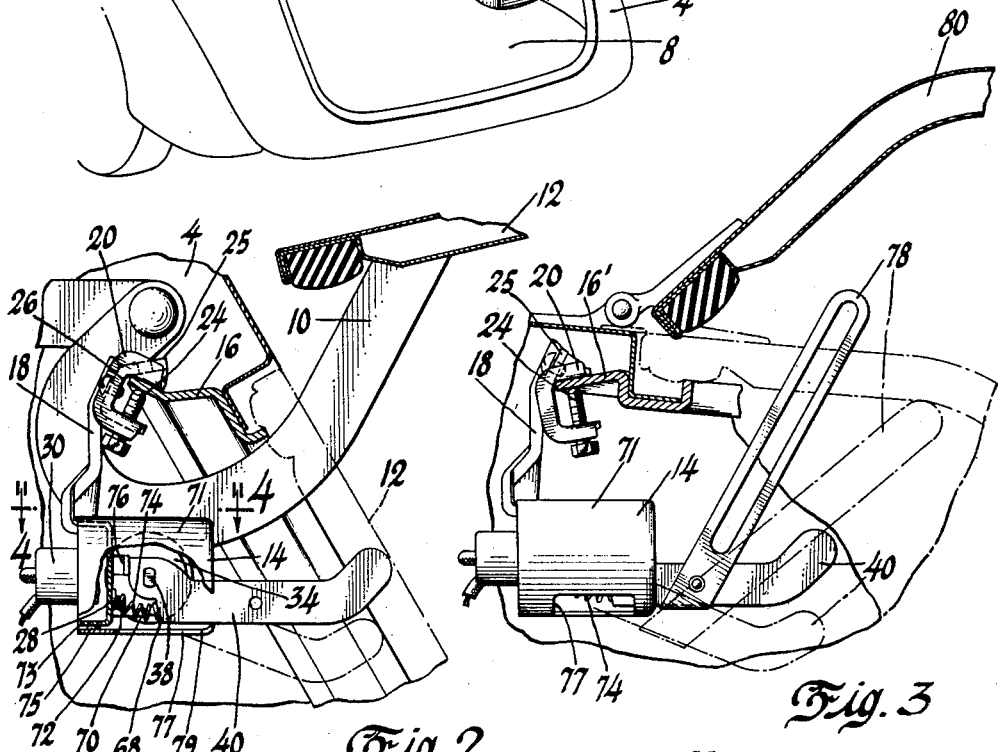
Fig. 2
Fig. 3
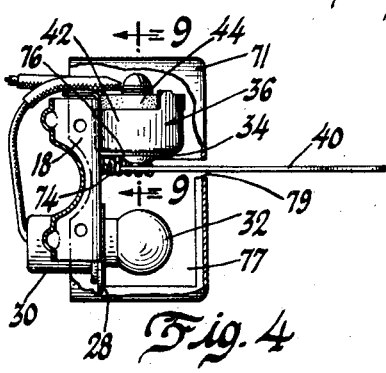
Fig. 4
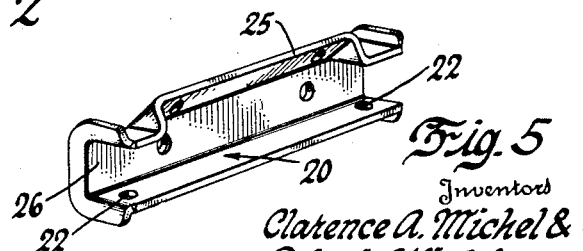
Fig. 5
Inventors
Clarence A. Michel &
Robert Winkelmeyer
By Blackmore, Spencer & Flint
Attorneys Dec. 7, 1937. C. A. MICHEL ET AL 2,101,748
LUGGAGE COMPARTMENT LAMP
Filed May 27, 1935 2 Sheets-Sheet 2
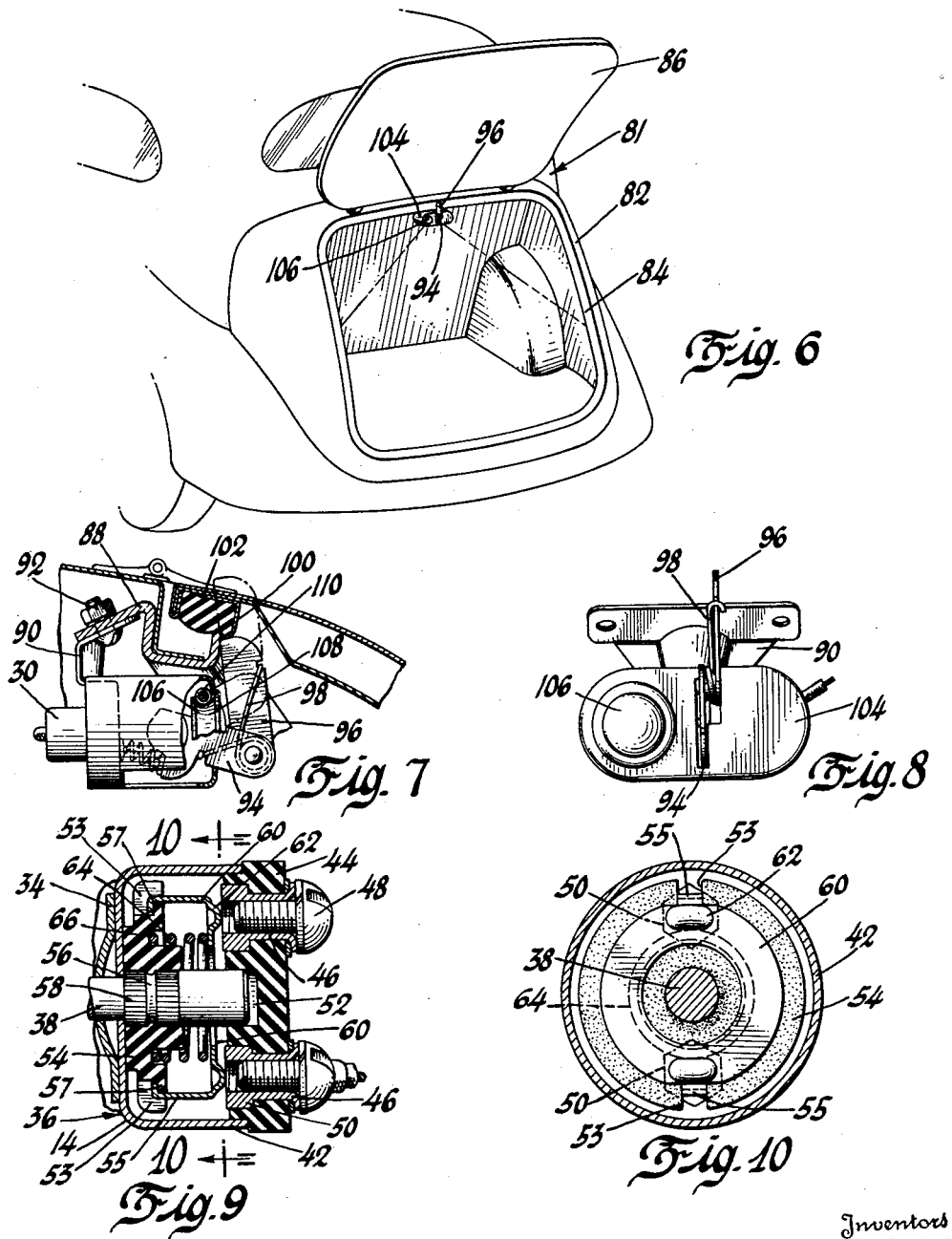
Inventors
Clarence A. Michel &
Robert Winkelmeyer.

Patented Dec. 7, 1937

2,101,748

UNITED STATES PATENT OFFICE 2,101,748

LUGGAGE COMPARTMENT LAMP

Clarence A. Michel and Robert Winkelmeyer, Anderson, Ind., assignors to General Motors Corporation, Detroit, Mich., a corporation of Delaware Application May 27, 1935, Serial No. 23,656

7 Claims. (Cl. 240—7.1)

This invention relates to lighting in respect to automotive vehicles and more specifically to the lighting of luggage or storage compartments therein.

With the present trend toward the more widespread use of a compartment in the rear body panel for luggage, spare wheel, tools, etc., a need has arisen for the illumination of this space as it is so frequently used.

It is therefore an object of our invention to provide suitable illuminating means for the storage compartment.

It is a further object to provide illuminating means that may be easily applied to cars now in operation and which may be turned on or off by moving the hinged cover.

It is a still further object of our invention to provide, in combination with the interior compartment light, an auxiliary tail light which will shine to the rear when the hinged cover is in its raised position.

With these, and other objects in view, which will be evident as the specification progresses, the embodiments of our invention will be better understood by reference to the following specification and claims and illustrated in the accompanying drawings, in which, Fig. 1 is a perspective view of the rear portion of a motor car showing our device in position in the luggage compartment.

Fig. 2 is a side elevation showing our device in its attached position, parts being broken away and shown in section.

Fig. 3 is a view similar to Fig. 2 showing the adaptation of the same unit in a different car body style.

Fig. 4 is a sectional view taken on the line 4—4 of Fig. 2.

Fig. 5 is a perspective view of the supporting bracket.

Fig. 6 is a perspective view of the rear portion of a motor car showing a modified form of our invention applied thereto.

Fig. 7 is a side elevation showing this form of invention in position, parts being shown broken away and in section.

Fig. 8 is a front view of this modified form.

Fig. 9 is an enlarged sectional view taken on the line 9—9 of Fig. 4.

Fig. 10 is a sectional view taken on the line 10—10 of Fig. 9.

A motor car, generally designated at 2, is shown having a rear panel 4 in which there is a large opening 6 which gives access to a storage or luggage compartment 8 in the rear of the body. Supported on two hinges 10, at its upper edge, is a cover or door 12 which acts to close the opening 6 and seal the same against entry of water, dust, etc. Inside the compartment, and attached thereto at the upper edge of the opening 6 and substantially midway between the two hinges 10, is an illuminating element designated generally at 14.

Referring now more specifically to Fig. 2 for details, the lighting element 14 is secured in position by attachment to an angular surrounding rim 16 which is secured to the edge of the rear panel 4 throughout the opening 6 to cause the edge portion to be more rigid and also provide sealing means with the cover 12 to prevent dirt and water from entering the compartment. The lighting element per se is formed of a bracket 18 whose upper end portion is connected to an elongated member 20, whose cross section is U-shaped, by short screws. In one of the side portions of the member 20 threaded openings 22 are provided through which project tap bolts 24 whose ends are rounded and which clamp the edge portion of the rim 16 between their ends and the other side panel of the member 20.

Since these lighting devices are to be attached to two different models of cars, that is, the model which has merely a comparatively flat surface on its rear panel with the storage compartment therein, or to the so-called trunk models in which the rear panel is pressed out to extend further to the rear and give a larger space therein, it is necessary to provide means for varying the angularity of attachment in that the surrounding rings in these two different models project at different angles. To take care of this feature, one of the side portions in the member 20 is offset, as shown in 25, and a pair of threaded openings is provided in this side, as well as in the base portion 26 of the member, and the bracket 18 of the assembly can be secured to either one of these sides for clamping attachment to the ring, depending onto which model car it is to be applied.

The lower end of the bracket is formed into a substantially flat section 28, which lies in substantially a vertical plane when the assembly is in position. Through one side of this portion 28 is secured a socket member 30 for electric bulb 32. A portion of the other side of the section 28 has a pressed-out lug 34 which extends at substantially right angles to the section and supports thereon a switch assembly, designated generally at 36. This type of switch is a rotary one in which there is a central shaft 38 which is rigidly connected to an operating lever 40. The shaft 38 passes through the lug 34 and the operating lever 40 is applied on the opposite side of the lug, which tends to retain the switch assembly in position. The switch itself is composed of an outer metallic cylindrical casing 42 which has across its open end a circular insulating plate 44 having molded therein a pair of contact members 46 the latter being hollow and internally threaded for two screws 48 which secure the terminal portions of the electric conductors which are fastened thereto. The inner portion of these contact members is slightly enlarged, as shown at 50, to provide sufficient electrical contact surface. The center of this insulating plate 44 has drilled partially therethrough a circular opening 52 which receives the inner end of the shaft 38 and acts as a bearing therefor. Rigidly secured to a portion of the shaft, adjacent its contact with the casing 42, is a second circular insulating plate 54 which is molded on the shaft and secured thereto by a groove 56 in the shaft and rough flutings 58 on a portion of the shaft adjacent the groove. Cut into the periphery of this plate 54, at diametrically opposite points, are two slots 53. Extending rearwardly from a circular bridging member 60 are two arms 55 whose ends extend into the slots 53 and which are then bent toward the axis of the shaft 38 to interengage raised portions 57 and prevent the bridging member 60 from disengagement with the plate 54. This bridging member has a pair of pressed-out knobs 62 at its forward face which act to give better surface contact with the contacts 50 on the plate 44. The central portion of the bridging member has a large circular hole therein which surrounds the shaft 38 and allows a sufficient amount of clearance therebetween.

A helical spring 64 surrounds the shaft 38 and has one end pressed against the inner surface of the bridging member 60 and its opposite end exerting force in a circular groove 66 in the face of the plate 54 and tending to press the bridging member into a firmer contact with the inner surface of plate 44 and contacts 50, the inward motion of course being limited by the contact of the inturned ends of the arms 55 with the projections 57. It will thus be seen that the normal operation of this switch will be effected by rotating the shaft 38 which in turn rotates the bridging member 60 by interengagement of the sides of the slots 53 with the arms 55. Also, the spring 64 will tend to press the bridging member toward the contacts as before mentioned.

The operating arm 40, which is non-rotatably secured to the shaft 38 and therefore pivots about the axis of the same, extends rearwardly from the assembly and has a vertical face 68 having a short projecting knob 70 extending therefrom. Also, upset from the section 28, is a similar projection 72 and secured over both of these projections and extending between the same is a compression spring 74. The action of this spring tends to keep the arm 40 in a substantially horizontal position against a small projection 76 extending from lug 34 which acts as a stop, and when the arm 40 is in this position it bridges the contacts to complete the circuit.

A casing member 71, adapted to house both the lighting means and the switch assembly, is built of sufficient size to slide over the flanged edge 73 of the base section 28 and is adapted to be held thereon by friction between these two mating surfaces and also by small raised portions 75 of the inner surface of the casing adjacent the flanges 73 and which are adapted to enter small openings in said flanges. In the lower face of the casing, adjacent the bulb 32, is a rectangular opening 77 through which the light from the bulb is projected downwardly into the compartment. There is also, in the forward face of the casing, an elongated slot 79 in which the lever arm 40 may reciprocate vertically, which slot connects with the opening 77 so that the arm 40 may be pressed downwardly below the lower surface of the casing.

It may thus be seen, with particular reference to Fig. 2, that when the cover 12 is in its raised position arm 40 will assume the full line position shown in Fig. 2 under which circumstances the switch will be turned on and the light allowed to illuminate the compartment. However, if the cover is lowered to its closed position the inner surface of the cover will contact the outer end of the arm 40 and force it down to the dotted line position, shown in Fig. 2, thereby rotating shaft 38 and shifting the bridging member so it no longer completes the circuit and the light will go out.

It should also be noted, in respect to this view, that the bracket member is secured to the base portion 26 of the supporting member 20. However, if this assembly is to be used with one of the trunk model cars, the surrounding ring member 16' is bent at a different angle and therefore the bracket 18 has to be secured to the member 20 through the pair of threaded openings in the side 25. When this is done the assembly again lies in a substantially horizontal plane, as shown in Fig. 3.

In this assembly also the hinged cover is considerably above the end of the operating arm 40 so that it is necessary to provide an adapter arm 78, which is secured to the arm 40 by a threaded screw, and the end of the arm 78 is then utilized to contact the inner surface of a cover 80 to operate the switch in the same manner as previously described, the on-and-off positions being shown in Fig. 3 in full and dotted lines respectively.

In Fig. 6 a motor car, designated generally at 81, has a built in trunk 82 on the rear thereof which has an opening 84 in its vertical face and cover 86 hinged at the top is adapted to close this opening in its normal running position. In this instance, as before, we have an angular ring 88 surrounding the opening 84 and to which a modified form of our device is secured. In this form is a short bracket 90 having a substantially flat securing section and whose lower supporting assembly section is identical to that shown in the previous disclosure and which supports in the same way a bulb and switch structure for lighting the same. The upper end of the bracket is set at a different angle to cooperate with the inner angle of the ring surrounding member 88 and is secured thereto by bolts 92. The operating arm 94, secured to the switch shaft, is shorter than before and has pivoted thereto at its outer end a second lever arm 96 which extends substantially vertically upward and is spring biased toward the assembly by a spring 98. When in its assembled position the upper corner of the arm 96 rides upon the exposed surface of the surrounding member 88 which projects upwardly to seal the joint and bears against the lower surface of the securing member 100 which holds the sealing means 102. It is thus evident that in this device as the cover is raised the arm will be allowed to rise until lever 96 has assumed the dotted line position in Fig. 7 at which time the switch will operate to turn on the light and, also, when the cover is closed it will again be pushed down to the full line position and the light extinguished.

Surrounding the bulb and switch mechanism is a hollow casing member 104 which fits over the outline of the section 28 and is held in place by friction against the same. Directly beneath the bulb, as before, is cut a rectangular opening to allow the light therefrom to project downwardly into the compartment but in this case there is also a circular opening directly ahead of the bulb and in this opening is secured a red lens 106 which has a smaller diameter to the rear adapted to pass through the opening and then an annular groove 108 in the periphery in which a coil spring 110 snaps to retain the lens in place. There is, of course, also a vertical slot in the forward face adjacent the lens in which the operating arm 94 may oscillate vertically to actuate the switch. In this device therefore when the cover is raised, as well as the assembly providing light for the compartment, a red beam is projected to the rear to act as an auxiliary tail light and to give a warning indication.

We claim:

1. An attachment for closed compartments with a hinged door for access thereto comprising a casing, a source of light supported therein, switching means for controlling the light also supported within the casing, spring biased operating means extending from the casing and multiple position clamping means attached to the casing for connecting the same to the compartment adjacent the door whereby the operating means will be operated by the door movement.

2. In a compartment light, an angle bracket having a substantially flat end portion, a lug upturned from the portion at right angles substantially in the center, switching means carried by the lug, lighting means carried on the flat end portion, operating means on the switching means and spring biasing means between the operating means and the end portion.

3. In a compartment light, an angle bracket having a substantially flat, wide end portion, a lug upturned from the portion, switching means carried thereby, lighting means supported by the portion, a flanged edge on the portion and a hollow casing to enclose the two means adapted to slide over the flange and be supported thereon.

4. In a compartment lamp, a bracket having a substantially flat portion, a lamp socket and a bulb carried thereby, a lug upturned from this portion, a switch carried on the lug, a flanged edge on the flat portion, a casing sliding over and supported on the flanged edge, a spring biased arm for the switch extending through an elongated opening in the casing, a second spring biased adapter arm pivotally connected to the end of the first arm and two openings in different faces of the casing adjacent the bulb and a lens in one of said openings.

5. In a compartment light, a bracket, lighting and switching means carried by one end of the bracket, a casing surrounding the two means and also carried by the bracket and mounting means secured to the opposite end of the bracket comprising a long member U-shaped in cross section, a plurality of clamping bolts extending through one of the side arms of the member toward the other and a plurality of threaded openings for proper attachment under different circumstances.

6. In a compartment light, a base, an upstanding bracket punched from the base, switch mechanism carried by the bracket, illuminating means carried by the base adjacent the bracket and on the opposite side from the punched opening, a hollow casing housing the switching and illuminating means frictionally engaging the base periphery for support and having openings therein adjacent the switch mechanism and the illuminating means whereby light may be emitted and through which the switch operated.

7. In a motor car having a rear storage compartment and a hinged cover therefor, a base secured within the compartment, illuminating and switching means carried by the base, a casing housing the means and supported by the base and having a plurality of openings therein, two of said openings lying in faces at right angles to each other adjacent the illuminating means whereby light may be sent to the rear for warning when the cover is open and also into the compartment, and an operating lever attached to the switch and projecting through another opening and so positioned as to contact the cover for operation.

CLARENCE A. MICHEL.
ROBERT WINKELMEYER.